United States Patent
Miller et al.

(10) Patent No.: US 6,760,122 B1
(45) Date of Patent: Jul. 6, 2004

(54) REDUCING QUANTIZATION ERRORS IN IMAGING SYSTEMS

(75) Inventors: Steven O. Miller, Vancouver, WA (US); Jay S. Gondek, Camas, WA (US); Thomas B. Pritchard, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/379,983

(22) Filed: Aug. 24, 1999

(51) Int. Cl.[7] .......................... H04N 1/405; H04N 1/409; H04N 1/58; H04N 1/60
(52) U.S. Cl. ....................... 358/1.9; 358/3.13; 358/3.19; 358/3.26; 358/523; 358/534
(58) Field of Search ................................. 358/1.9, 3.06, 358/3.13, 3.19, 3.26, 518, 534, 535, 523

(56) References Cited

U.S. PATENT DOCUMENTS 6,115,031 A * 9/2000 Love et al. ................... 358/1.9
6,215,561 B1 * 4/2001 Kakutani ..................... 358/1.9

* cited by examiner

Primary Examiner—Scott Rogers

(57) ABSTRACT

A technique is described to greatly reduce or avoid the quantization errors that occur when mapping a relatively linear RGB color space into a greatly non-linear printer CMY color space of equal precision, avoiding the contouring or banding that occurs when printing color gradients in a non-linear printing system. The technique performs a dither-like process on the original RGB continuous tone data. The RGB values are dithered to create a range of values that, when mapped to the non-linear printer continuous tone CMY values, creates a range of CMY values that, on average, represent the correct average tone of the input RGB values. The generated CMY continuous tone values are then halftoned and printed.

21 Claims, 5 Drawing Sheets

REDUCING QUANTIZATION ERRORS IN IMAGING SYSTEMS

FIELD OF THE INVENTION

This invention relates to imaging systems, such as printers, and, more particularly, to a technique for reducing quantization errors when printing varying shades of a color to avoid visible contouring or banding in the printed image.

BACKGROUND OF THE INVENTION

A conventional color printer, such as an inkjet printer that prints dots of primary color inks on a medium, is frequently used to reproduce a color image from a monitor that smoothly changes the shade of a color from, for example, white to blue. However, due to limitations in the printer, each of the shades created by a computer for display on the monitor may not be accurately reproduced by the printer on the medium. One reason for this is that the amount of ink deposited for each pixel location on the medium is limited to a maximum number of ink drops. As a result, two or more different shades of a color displayed on a monitor are often reproduced as the same printed color by the printer. Thus, when printing a continuous change of shade, visible gradations between the shades occur due to the color step quantization by the printer being larger than the original quantization by the computer when creating the image.

Reasons other than the printer's limit on the amount of ink that can be deposited in a pixel location on the medium also account for this undesirable contouring or banding, but the limitation on the amount of ink deposited will be used as an example to illustrate how contouring or banding results.

Colors are typically created by a conventional computer for display on a monitor using the RGB color space. Typically, each primary color is identified with an 8-bit value, giving 256 levels per primary, so that the complete RGB color is specified as a 24-bit value. Ink printers typically print using cyan (C), magenta (M), and yellow (Y) inks. When an RGB input value specifies the range of colors from white to full magenta, the print engine may create this color by varying the amount of magenta from zero to 100%, with 100% representing either a fully saturated magenta or the maximum amount of ink the print engine will allow. Such a range of colors printed with a printer's primary colors (cyan, magenta, yellow) will use the full range of 256 levels since only one ink is used.

However, when the printer is used to produce colors from white to blue, which is composed of cyan and magenta, the print engine will typically vary the amount of cyan and magenta from zero to as little as 50% of the maximum allowable ink for each colorant so that the total amount of ink deposited for the blue is no more than the maximum allowable quantity of ink for that pixel position. Hence, to create a secondary color, requiring two primary ink colors, as little as 50% of each primary colorant may be used. This situation is worsened when all three primary inks (CMY) must be used to create the color, such as when producing a composite grayscale ramp. In the case of a grayscale ramp, printing the gray tones from white to black will vary the amount of CMY ink from zero to as little as 33% of the maximum allowable ink for each colorant, since an equal amount of the C, M and Y inks must be used to create black and the total amount of ink deposited to create black is limited to the maximum ink quantity of approximately 100%.

Since 100% of each primary ink color is not used, this causes quantization (gradation) problems when the 8-bit/plane RGB data is transformed (color matched) into the printer specific color space, such as CMY or CMYK (if black ink is also used in the printer), where multiple unique RGB values are mapped to a single CMY or CMYK value. Typically, the 24-bit RGB data (8-bits/plane) is used to specify an 8-bits/plane CMYK color as the internal representation of a continuous tone device space color. When producing the blue gradient, the 256 levels of color from white to pure blue (R, G, B=255, 255, 255 to R, G, B=0, 0, 255) will be mapped into only approximately 128 levels of CMYK (C, M, Y, K=0,0,0, 0 to C, M, Y, K=128,128, 0, 0). Thus, on average, two levels of CMYK color will be mapped to each of the 256 levels of the RGB color. With a composite grayscale tone range, as few as 85 CMY levels (256/3) may be created, causing even more visible gradation stair-steps or banding in the printed output due to a greater level of quantization during the color space transformation.

The following TABLE I demonstrates how a grayscale tone ramp from white to black is mapped from RGB data to CMY data for a typical CMY inkjet printer. Only ten levels are shown for simplicity starting from pure white. In this grayscale tone map, for the 256 input RGB tone levels, substantially fewer than 256 output CMY tone levels are used, which results in as many as three RGB input tone values mapping to a single CMY output tone value.

TABLE I

Grayscale Tone Mapping

| Input R,G,B | Resulting C,M,Y Values |
| --- | --- |
| 255,255,255 | 0,0,0 (white) |
| 254,254,254 | 0,0,0 |
| 253,253,253 | 1,1,1 |
| 252,252,252 | 1,1,1 |
| 251,251,251 | 1,1,1 |
| 250,250,250 | 2,2,2 |
| 249,249,249 | 2,2,2 |
| 248,248,248 | 2,2,2 |
| 247,247,247 | 3,3,3 |
| 246,246,246 | 3,3,3 |

FIG. 1 illustrates a conventional process performed by a printer in combination with a conventional computer. In step 1, the initial monitor RGB data is generated using, for example, 8 bits per plane.

In step 2, this RGB data is transformed into the color space of the printer, such as the CMY color space. This transformation may be performed using a look-up table or an algorithm. The output of step 2 is CMY data with 8-bits per plane, and, for composite colors, the same CMY color value will be used for more than one RGB color value due to the limitations of the conventional printer as previously described. As previously mentioned, this is a source of visible contouring or banding in the printed image. In step 3, the CMY continuous tone color will be converted into a halftone pattern of dots of the C, M and Y inks. Conventional halftoning techniques include error diffusion, ordered dithering using a threshold array, or other conventional techniques.

In step 4, the data is then used to energize ink ejection elements in a printhead to print the CMY dots on a medium.

What is needed is a technique for reducing the extent of contouring or banding hen printing shades of colors.

SUMMARY

One technique described to greatly reduce or avoid contouring or banding when printing shades of colors is to perform a dither-like process on the original monitor RGB data to generate different RGB data values for each original monitor RGB data value. One example of the dither process is to generate a first RGB value greater than the original RGB value and a second RGB value less than the original RGB value, so that the average of the two values equals the original RGB value. Each of the two RGB values is then associated with a different CMY value when mapping the RGB color space into the printer's CMY color space, so that the average of the two CMY values is approximately that needed to represent the original RGB value.

The dithering reduces the effects of the quantization by varying the RGB data enough so that it dithers across the quantization boundaries and creates, on average, a unique and correct CMY output tone for each RGB input tone.

In one embodiment, noise is added to the original RGB value. This is a form of dithering. For example, for a gray scale, the noise is either 1, 0, or −1 added to the individual RGB planes, so that a single RGB value may be dithered into three different RGB values whose average is the original RGB value. Each of these three RGB values is then associated with a CMY value, whose average is a unique/correct CMY value corresponding to the original RGB value. This triples the number of effective CMY color levels so that the 256 RGB levels have a corresponding 256 CMY levels.

In another embodiment, assume the original RGB value is 253, 253, 253. This value may be dithered down to 7-bits/plane of precision. This produces a dither between two values, each representing fifty percent of the pixel color, the first value being 254, 254, 254 and the second value being 252, 252, 252. These corresponding CMY values may be 0,0,0 and 1,1,1, on average creating an equivalent CMY color of 0.5, 0.5, 0.5. Such a CMY color was not available using conventional techniques. Even numbered RGB color planes, such as 252, 252, 252, are not dithered since they are precisely represented with 7-bits/plane of precision. The generated CMY values in one example range from 0 to 128 when reproducing secondary colors, while the RGB values range from 0 to 255. However, for the types of systems described, the inventive technique generates a unique average CMY value for virtually each RGB value, effectively providing 256 CMY unique color values.

An additional benefit of this technique, where the RGB data is dithered down to 7-bits/plane of precision, is that the RGB-to-CMY color space transformation step is only required to handle 21-bit RGB data.

The remainder of the printing process may be identical to that of the prior art where the generated CMY continuous tone values are then halftoned and printed. This process is also applicable to non-printer applications.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION OF THE EMBODIMENTS

Figure 1:
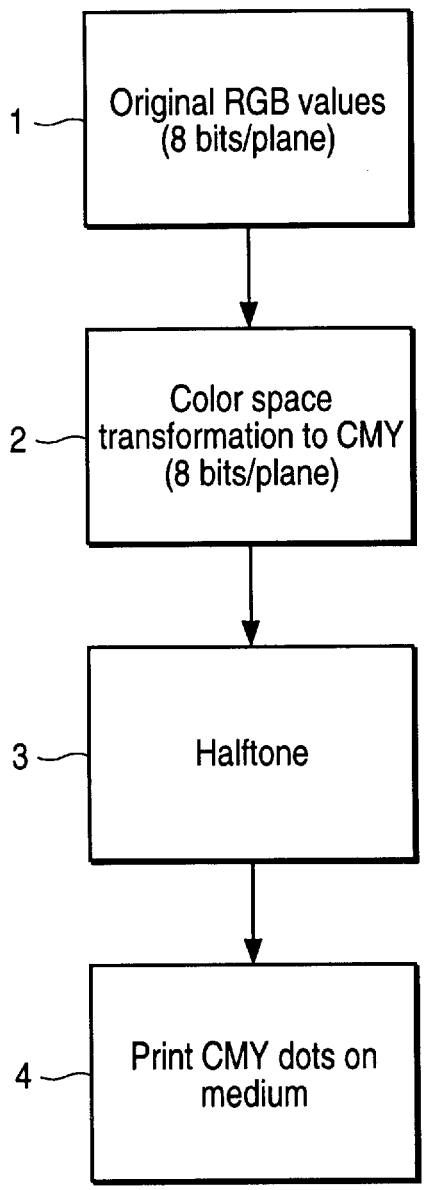
FIG. 1 is a flow chart of a conventional process for transforming an original RGB color into printed dots in a printer's color space.
Figure 2:
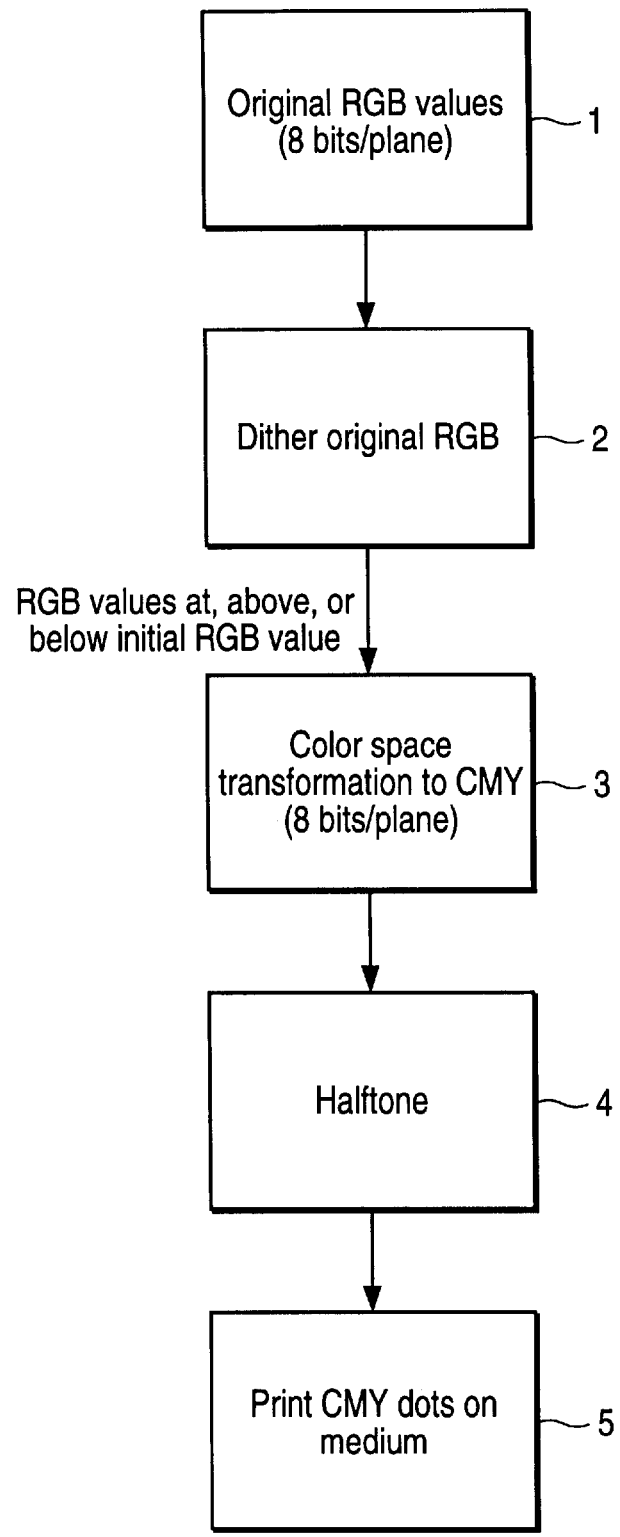
FIG. 2 is flow chart illustrating one embodiment of the invention using dithering, prior to transformation into the printer's color space.

FIG. 2 is a flow chart illustrating one embodiment of the invention. The steps in FIG. 2 that have the same label in FIG. 1 (e.g., halftone) may be those same conventional steps. The difference between FIG. 2 and FIG. 1 is in step 2 of FIG. 2 where the original RGB data is dithered using any one of a number of dithering techniques to create various RGB values, as appropriate, for each original monitor RGB value, where the average of the dithered RGB values is equal to or approximately equal to the original monitor RGB value.

In step 1 of FIG. 2, the original monitor RGB values are generated, with typically 8-bits/plane data.

In step 2 each plane of this RGB data is dithered down to 7-bits of precision to generate some RGB values greater than the original RGB value and some RGB values less than the original RGB value so that the average is the original RGB value. Even numbered RGB color planes, such as 252, 252, 252, are not dithered since they are already precisely represented with 7-bits/plane precision. The dithering in step 2 may be accomplished by either a look-up table or an algorithm. Implementing such dithering would be well within the skills of those in the art after reading this disclosure.

The remaining steps 3–5 may be similar to steps 2–4 in FIG. 1.

Figures 3, 5:
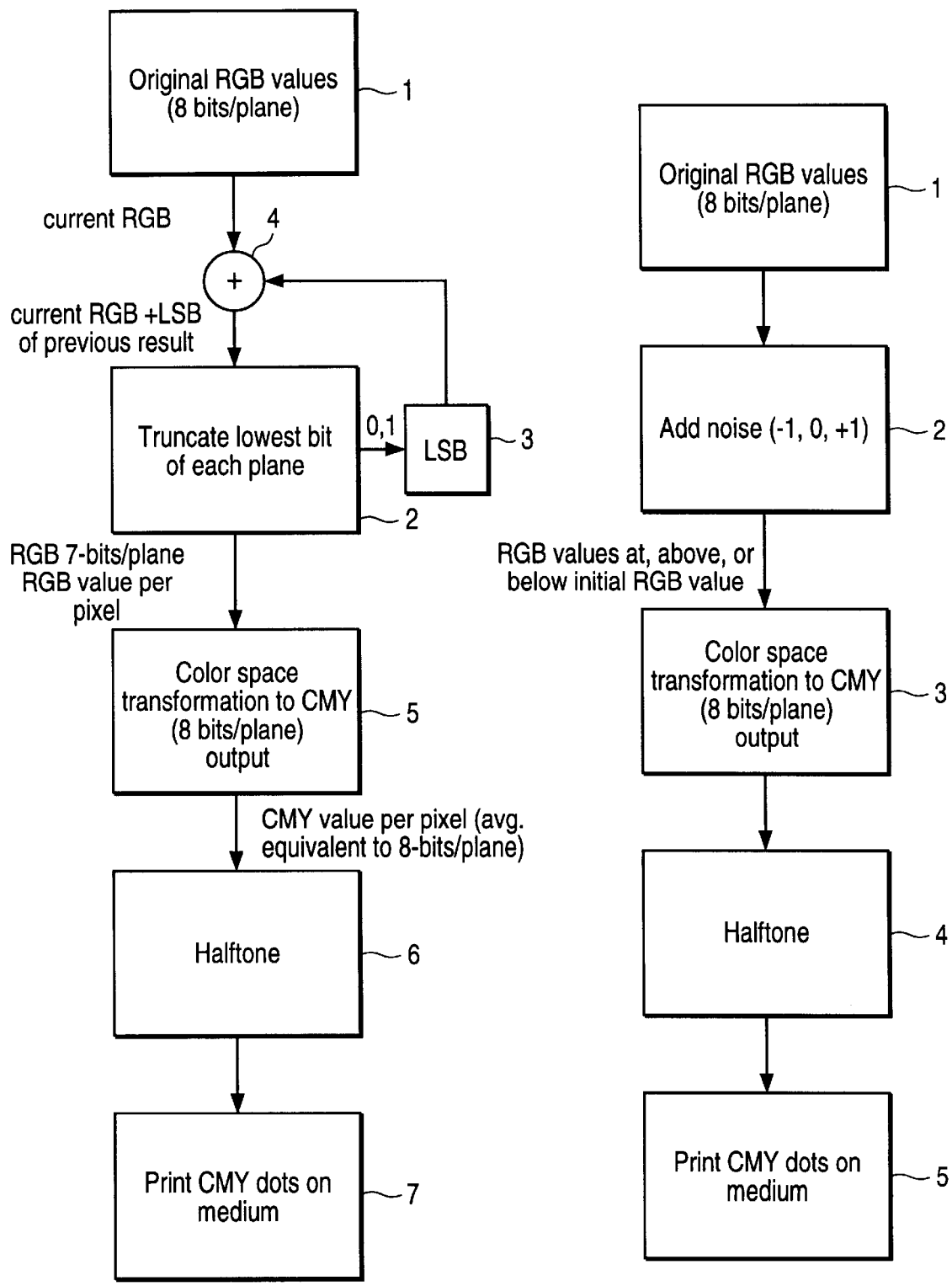
FIG. 3 is a flow chart illustrating one technique for performing the dithering in FIG. 2
FIG. 5 is a flow chart illustrating another technique for performing the dithering in FIG. 2 by using the addition of noise.

Table II below shows the first ten RGB values in a grayscale tone map and their resulting CMY values without performing dithering on the RGB values. This table represents a system with less severe quantization than described in Table I. The technique in FIG. 3 is sufficient to eliminate this level of quantization.

TABLE II

| Grayscale Tone Map Without Dithering | |
|---|---|
| Input R,G,B | Resulting C,M,Y Values |
| 255,255,255 | 0,0,0 |
| 254,254,254 | 0,0,0 |
| 253,253,253 | 1,1,1 |
| 252,252,252 | 1,1,1 |
| 251,251,251 | 2,2,2 |
| 250,250,250 | 2,2,2 |
| 249,249,249 | 3,3,3 |
| 248,248,248 | 4,4,4 |
| 247,247,247 | 4,4,4 |
| 246,246,246 | 5,5,5 |

Table III below provides examples of the dithered RGB values for nine of the grayscale tone levels in Table II along with their corresponding CMY values and the average CMY values. The CMY values are obtained from the map of Table II after the dithering. White is treated as a special case.

TABLE III

Grayscale Tone Map With Dithering

| Input R,G,B | Dithered R,G,B, Values | Resulting C, M,Y Values | Average C,M,Y Values |
|---|---|---|---|
| 255,255,255 | 100% 255,255,255 | 0,0,0 | 0,0,0 |
| 254,254,254 | 100% 254,254,254 | 100% 0,0,0 | 0,0,0 |
| 253,253,253 | 50% 254,254,254 | 50% 0,0,0 | 0.5,0.5,0.5 |
|  | 50% 252,252,252 | 50% 1,1,1 |  |
| 252,252,252 | 100% 252,252,252 | 100% 1,1,1 | 1,1,1 |
| 251,251,251 | 50% 252,252,252 | 50% 1,1,1 | 1.5,1.5,1.5 |
|  | 50% 250,250,250 | 50% 2,2,2 |  |
| 250,250,250 | 100% 250,250,250 | 100% 2,2,2 | 2,2,2 |
| 249,249,249 | 50% 250,250,250 | 50% 2,2,2 | 3,3,3 |
|  | 50% 248,248,248 | 50% 4,4,4 |  |
| 248,248,248 | 100% 248,248,248 | 100% 4,4,4 | 4,4,4 |
| 247,247,247 | 50% 248,248,248 | 50% 4,4,4 | 4.5,4.5,4.5 |
|  | 50% 246,246,246 | 50% 5,5,5 |  |

The values in Table III were derived using the technique of FIG. 3, which truncates the lowest bit of a current RGB value and diffuses this lowest bit into a neighboring pixel. For example, for the RGB value 253,253,253 (step 1 in FIG. 3), the LSB of each of these values is 1 (since the value is an odd number). These LSBs are truncated (step 2 in FIG. 3) from the original values to create a 7 significant bits/plane RGB value of 252,252,252. This value translates into the CMY value of 1,1,1 in the color space transformation (step 5), which has an input precision of 7-bits/plane and an output precision of 8-bits/plane. The truncated LSBs are added to the next incoming pixel (step 4) which, for this example, is another pixel of RGB value 253,253,253. Adding the LSBs of RGB value 1,1,1 to the incoming pixel creates the RGB value of 254,254,254. The LSBs of this pixel are then again truncated (step 2), but because the RGB values 254,254,254 are even values, the LSB is 0 and the resulting 7-bit/plane RGB value is still 254,254,254. This value translates into the CMY value of 0,0,0 in the color space transformation (step 5). The result of processing these two input pixels (of input value 253,253,253) results in one RGB value of 252,252,252 and one RGB value of 254,254,254 being color space transformed into CMY values 1,1,1 and 0,0,0 respectively. The average CMY values are therefore 0.5,0.5,0.5 for these two input pixels of RGB value 253,253,253.

The two CMY values of 1,1,1 and 0,0,0 are halftoned in step 6 using any conventional halftone technique to cause the print engine to print dots (step 7) on a medium, where the overall visual perception of the dots corresponds to the average of the CMY values 1,1,1 and 0,0,0.

The even numbered RGB planes (e.g., 252,252,252), in the example of Table III, have an LSB of 0 so are not affected by truncation.

Pure white is treated as a special case and will correspond to a CMY continuous tone value of 0,0,0. Although there are fewer usable discrete CMY continuous tone values than RGB values, e.g., 128 or 85 versus 256, the dithering will generate about one average CMY value for each of the 256 RGB values. Thus, a varying shade of a color viewed on a monitor will be accurately reproduced by a color printer without the contouring or banding previously described.

Figure 4:
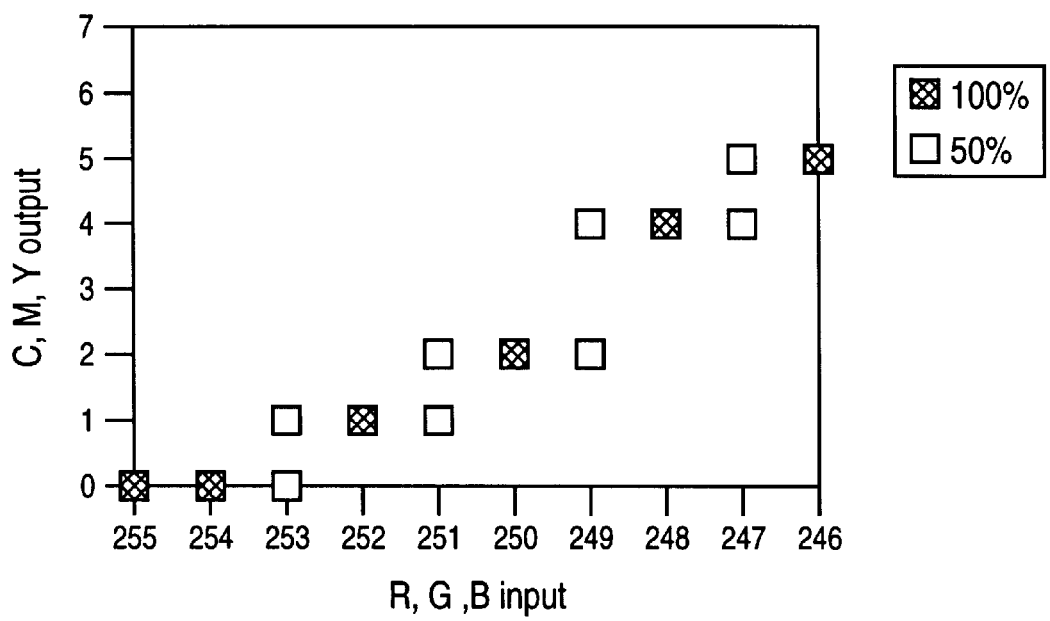
FIG. 4 is a partial graph of the CMY tones generated from the original RGB tones using one embodiment of the present invention.

FIG. 4 is a partial graph of the resulting CMY values for each original RGB value showing that each RGB input level creates a unique set of CMY output levels.

One skilled in the art will understand the application of the dithering technique to any color ramp and can achieve 256 effective CMY color tone levels (for an 8-bits/plane system) using this technique for any color ramp.

Any form of dithering (converting one color value into various color values) may be used in step 2 of FIG. 2.

FIG. 5 is a flow chart of a technique which produces results similar to that described with respect to FIG. 3 but instead adds noise to the original RGB values. This noise may be predetermined, random or pseudo-random in order to vary the RGB values so that, when transformed into CMY values, the CMY values, on average, represent a more precise transformed color value, reducing or eliminating quantization during the color transformation.

Table IV below is a partial grayscale tone map showing various input RGB values and corresponding CMY values without using the present invention. The level of CMY quantizing in Table IV is even higher than in Table II.

TABLE IV

Grayscale Tone Map Without Noise Added

| Input R,G,B | Resulting C,M,Y Values |
|---|---|
| 255,255,255 | 0,0,0 |
| 254,254,254 | 0,0,0 |
| 253,253,253 | 1,1,1 |
| 252,252,252 | 1,1,1 |
| 251,251,251 | 1,1,1 |
| 250,250,250 | 2,2,2 |
| 249,249,249 | 2,2,2 |
| 248,248,248 | 2,2,2 |
| 247,247,247 | 3,3,3 |
| 246,246,246 | 3,3,3 |

In Table IV, an identical CMY value corresponds to three different RGB values. The goal is to have, on average, a unique CMY value associated with each RGB value. In step 2 of FIG. 5, 33% of the time 0 is added to the RGB value, 33% of the time 1 is added, and 33% of the time 1 is subtracted. The result is that each RGB value (white and black are exceptions) is varied amongst three different dithered RGB values having an average value equaling the original RGB value. The magnitude of the variance (dithering) applied to the RGB values is dependent upon the degree of quantization to be compensated.

Table V shows the resulting CMY values obtained using this technique. The CMY value for each dithered RGB value is obtained from Table IV. Table V also shows the unique average CMY value for each original RGB value.

TABLE V

Grayscale Tone Map After Noise Added

| Input R,G,B | Dithered R,G,B, Values | Resulting C, M,Y Values | Average C,M,Y Values |
|---|---|---|---|
| 255,255,255 | 100% 255,255,255 | 0,0,0 | 0,0,0 |
| 254,254,254 | 33% 255,255,255 | 67% 0,0,0 | 0.33,0.33,0.33 |
|  | 33% 254,254,254 | 33% 1,1,1 |  |
|  | 33% 253,253,253 |  |  |
| 253,253,253 | 33% 254,254,254 | 33% 0,0,0 | 0.67,0.67,0.67 |
|  | 33% 253,253,253 | 67% 1,1,1 |  |
|  | 33% 252,252,252 |  |  |
| 252,252,252 | 33% 253,253,253 | 100% 1,1,1 | 1,1,1 |
|  | 33% 252,252,252 |  |  |
|  | 33% 251,251,251 |  |  |
| 251,251,251 | 33% 252,252,252 | 67% 1,1,1 | 1.33,1.33,1.33 |
|  | 33% 251,251,251 | 33% 2,2,2 |  |
|  | 33% 250,250,250 |  |  |
| 250,250,250 | 33% 251,251,251 | 33% 1,1,1 | 1.67,1.67,1.67 |
|  | 33% 250,250,250 | 67% 2,2,2 |  |
|  | 33% 249,249,249 |  |  |
| 249,249,249 | 33% 250,250,250 | 100% 2,2,2 | 2,2,2 |
|  | 33% 249,249,249 |  |  |
|  | 33% 248,248,248 |  |  |

The resulting CMY values are halftoned and printed as dots on the medium as previously described.

Figure 6:
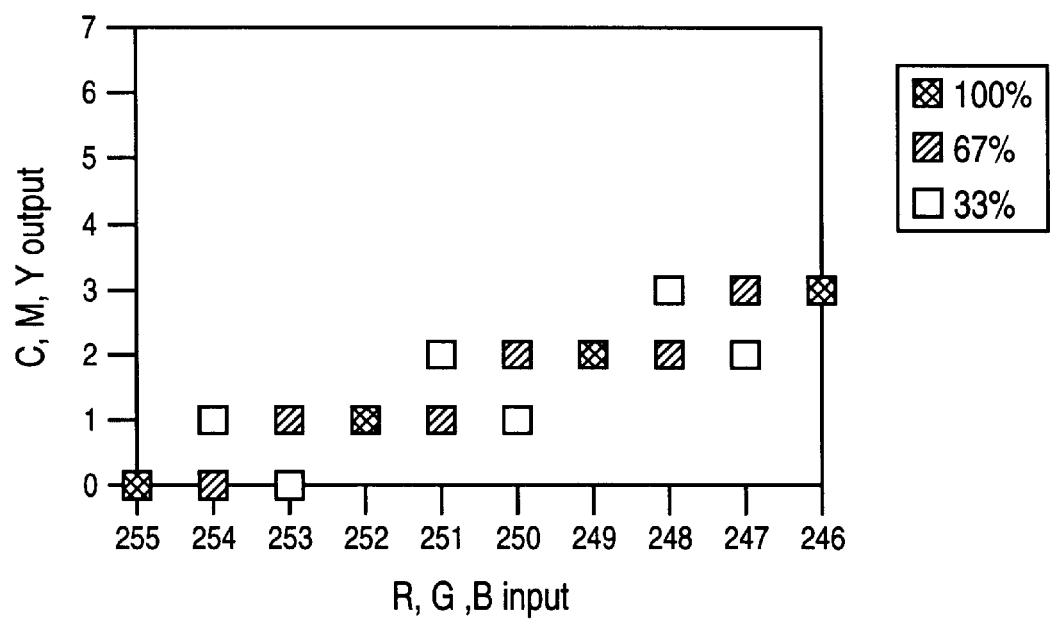
FIG. 6 is a partial graph of the CMY tones generated using the technique of FIG. 5.

FIG. 6 is a partial graph of the CMY output vs. RGB input for Table V illustrating the unique CMY value set for each RGB input.

The method of FIG. 5 is a more versatile form of the invention and allows more quantization steps to be compensated for by increasing the levels of noise added to the RGB values. The level of noise can be more tightly controlled and tuned for the particular level of quantization in the targeted system.

The level of dithering of the input signal is dependent upon the amount of quantization in the various stages of the imaging pipeline, the level of precision in these stages, and the desired number of tone steps. For typical inkjet printers with an imaging system that processes 8-bits per plane of monitor RGB into binary (1-bit per printer pixel) CMYK data, dithering the RGB values with a signal of +/−1 to 2 units out of 256 tonal levels is typically enough to overcome most quantization errors and enable a full 256 level tone range for each color component throughout the entire color space.

This dithering will typically not introduce noticeable artifacts in the printed output. This can be understood when it is pointed out that most high quality printed images contain a significant amount of noise in the source RGB image. Even in smooth areas of a digitally captured image, this noise is typically much greater than the +/−1 to 2 units required to overcome the quantization errors. Even so, these areas will print as a smooth, solid color with sharp details using a high quality printing system, as will areas dithered to reduce quantization errors.

Figure 7:
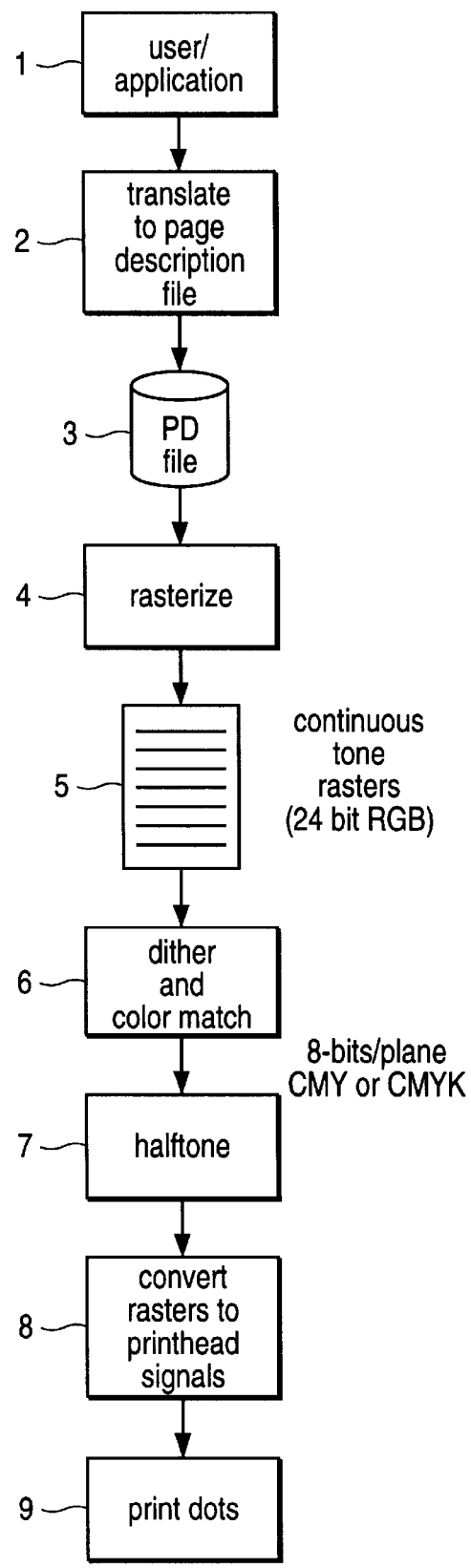
FIG. 7 is a flow chart illustrating a more detailed description of the conversion of RGB data into printed dots.

FIG. 7 is a more complete flow chart of the entire process of transforming original data from a user application (such as that used to display an image on a monitor) to signals applied to a printhead. In step 1 the user or the application generates the original data. In step 2 this data is transformed into a page description (PD) language file step 3 for printing.

In step 4, the constructed PD page is rasterized for the color components and, if appropriate, for the black (K) ink components. The K components are typically used for text and dark colors. In step 5, the RGB raster is stored in a memory.

In step 6, the inventive technique is employed, which may take the form of an algorithm or a look-up table. The RGB values are applied to the functional block of step 6 and converted into one or more of the printer color space values for each RGB value. If the printer also includes a black ink printhead, certain black components, such as text, may not be processed in step 6.

The CMYK values output from step 6 are then halftoned in step 7. Halftoning determines the placement of CMYK ink droplets to be deposited on the medium. In one type of printer, there are eight levels of tone for each pixel position on the medium. These eight levels of tone are achieved by depositing multiple ink drops of the same color ink, as necessary, in a single pixel position. This process is well-understood by those skilled in the art. Thus, a continuous tone color is achieved by both selecting the number of ink drops per color for a particular pixel and halftoning. Some halftoning techniques include error diffusion and ordered dithering. The K raster is not halftoned since the K raster is typically text, which is either full black or full white.

In step 8, the raster images are converted to bands for each scan of the printheads across the medium.

In step 9, the data is then timed to generate energization signals for the various ink ejection elements on the printheads.

Figure 8:
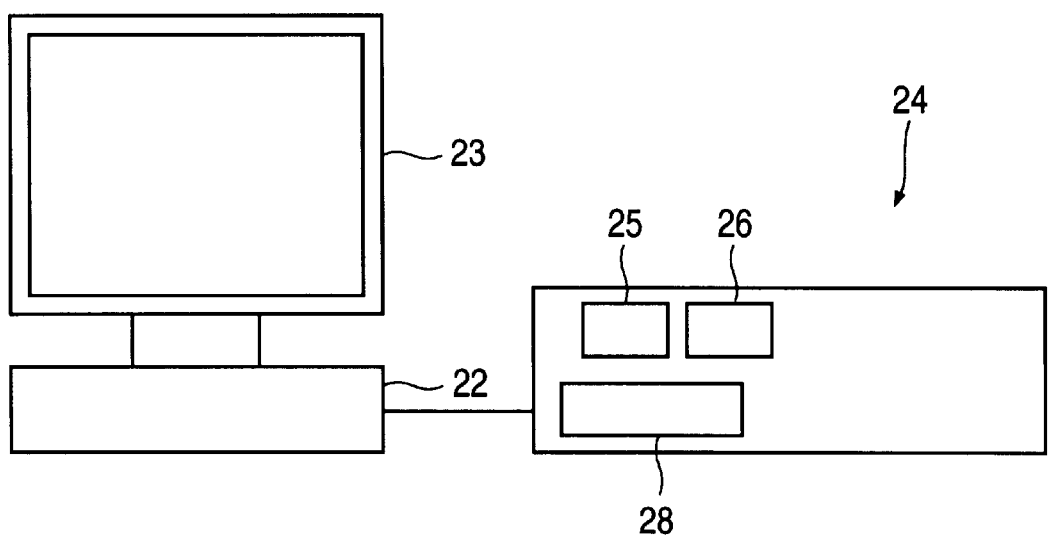
FIG. 8 illustrates a printer/computer system used to carry out the present invention.

FIG. 8 illustrates a conventional computer 22 and monitor 23 along with a printer 24 incorporating the present invention. A scanning carriage or stationary carriage includes a black printhead 25 and the CMY printheads 26. A print controller 28 converts incoming data into printhead energization signals. The techniques described herein are also applicable to any printing system or other display system that converts from one color space into another. The present invention may use the same hardware as in conventional printers, but the hardware is programmed using either software or firmware to carry out the step 6 in FIG. 7. The dithering and color matching may be carried out in a single step using a lookup table or algorithm. One skilled in the art would understand how to incorporate the techniques described herein into a printing system.

While particular embodiments of the present invention have been shown and described, it will obvious to those skilled in the art that changes and modifications may be made without departing from this invention in its broader aspects and, therefore, the appended claims are to encompass within their scope all such changes and modifications that fall within the true spirit and scope of this invention.

We claim:

1. A method comprising:
    generating a first set of color values in a first color space;
    dithering said first set of color values to generate at least one second set of color values;
    transforming said at least one second set of color values to a second color space in a display system to approximately reproduce said first set of color values; and
    wherein each of said color values in said first set of color values comprises N bits, and wherein said dithering comprises:
    truncating a least significant bit (LSB) of each color value in said first set of color values to obtain truncated color values; and
    adding said LSB of each color value to a next color value.

2. The method of claim 1 wherein said first set of color values comprises 8 bits/plane red, green, and blue (RGB) values, said dithering comprising truncating a least significant bit of each color value in said first set of color values to generate 7 bits/plane RGB values.

3. The method of claim 1 wherein said transforming comprises transforming said at least one second set of color values into a printer color space.

4. The method of claim 3 wherein said first set of color values comprises 8 bits/plane RGB values, said at least one second set of color values comprise 7 bits/plane RGB values, and colors in said second color space comprises 8 bits/plane primary colors in said display system.

5. The method of claim 1 wherein color values in said first color space comprise RGB values, and color values in said second color space comprise cyan, magenta, and yellow (CMY) values.

6. The method of claim 1 wherein said dithering comprises adding noise to each of said color values in said first set of color values.

7. The method of claim 6 wherein said adding noise comprises subtracting one from a color value, adding one to a color value, or not affecting said color value.

8. The method of claim 6 wherein said noise is predetermined, random, or pseudo-random.

9. The method of claim 1 wherein said transforming comprises applying said at least one second set of color values to a look-up table to transform said second sets of color values to said second color space.

10. The method claim 1 wherein said transforming comprises performing an algorithm on said at least one second set of color values to transform said at least one second set of color values to said second color space.

11. The method of claim 1 wherein said generating a first set of color values comprises generating color values on a computer in an RGB color space for display on a monitor.

12. The method of claim 11 wherein said transforming transforms dithered RGB values to said second color space for printing by a printer.

13. The method of claim 1 wherein said transforming generates transformed color values, said method further comprising printing said transformed color values.

14. The method of claim 1 wherein said transforming generates transformed color values, said method further comprising halftoning said transformed color values.

15. The method of claim 14 wherein said halftoning generates halftoned color values, said method further comprising printing said halftoned color values by an inkjet printer.

16. The method of claim 1 wherein said dithering generates two or more second sets of color values from a first set of color values.

17. An apparatus comprising:

a dithering device having as inputs a first set of color values in a first color space, said dithering device outputting at least one second set of color values for a first set of color values; and a transformer receiving said at least one second set of color values and transforming said at least one second set of color values to a second color space for being displayed in a display system; and dithering device truncates a least significant bit (LSB) of each color value in said first set of color values and adds said LSB to a next color value.

18. The apparatus of claim 17 wherein said dithering device adds noise to said first set of color values.

19. The apparatus of claim 17 wherein said first color space is an RGB color space and said second color space is that used by a printer.

20. The apparatus of claim 19 wherein said second color space is a CMY color space.

21. The apparatus of claim 19 wherein said second color space is a CMYK color space.

* * * * *